Jan. 14, 1969  M. J. SCHAEFFER  3,421,362
DEVICE OR APPARATUS FOR DETECTING IN AIR THE PRESENCE
OF COMBUSTIBLE OR INFLAMMABLE GASES
Filed April 30, 1965
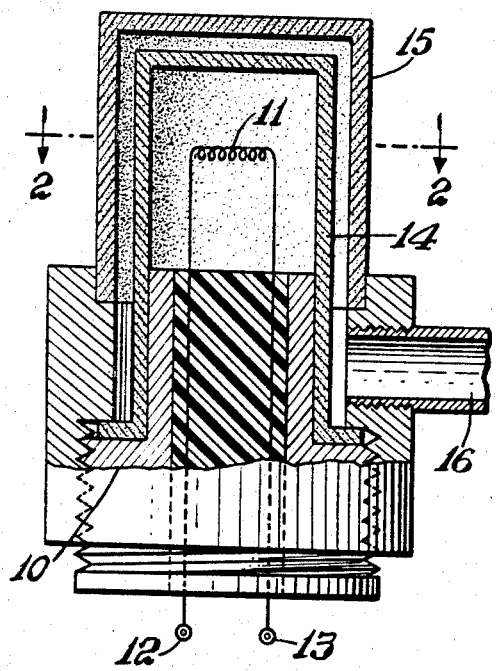
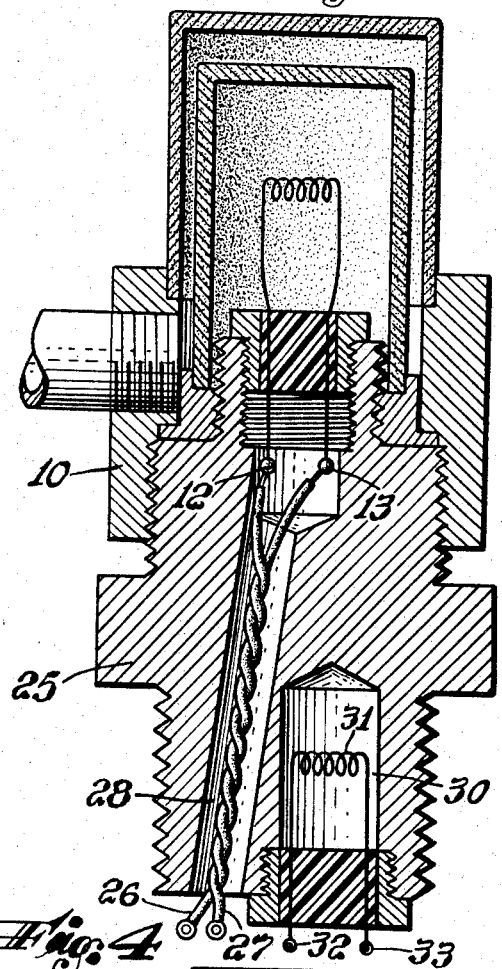
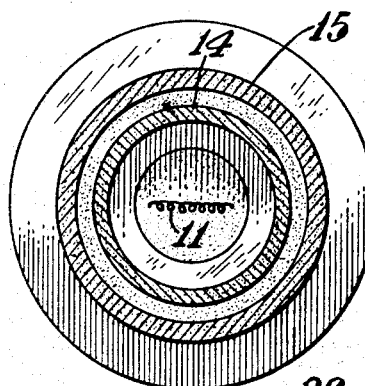
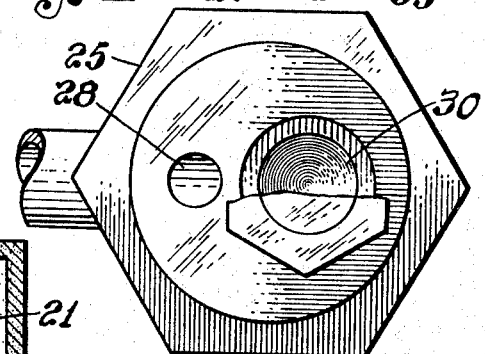
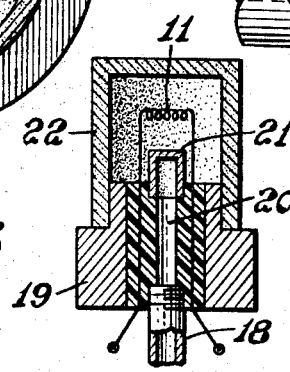
INVENTOR.
Matthew J. Schaeffer
BY
ATTORNEY

United States Patent Office 3,421,362
Patented Jan. 14, 1969

3,421,362
DEVICE OR APPARATUS FOR DETECTING IN AIR THE PRESENCE OF COMBUSTIBLE OR INFLAMMABLE GASES
Matthew J. Schaeffer, West Caldwell, N.J., assignor to Davis Emergency Equipment Co., Inc., Newark, N.J., a corporation of New York
Filed Apr. 30, 1965, Ser. No. 452,148
U.S. Cl. 73—23    4 Claims
Int. Cl. G01n 31/00

ABSTRACT OF THE DISCLOSURE

A gas detector includes a body member on which is mounted means for checking the detector means. A porous cap forms with the body member a chamber which encloses the detector means so that an external sample gas being tested may pass by diffusion through said porous cap into said chamber. The body member has a conduit leading into said chamber, and a second porous cap is disposed in said chamber between said conduit and said detector means thereby providing for introduction of a known gas by diffusion through said second porous cap into contact with said detector means so that the detector means may be zeroed on pure air or calibrated on a known combustible gas.

---

This invention relates to a device or apparatus for detecting in air the presence of combustible or inflammable gases.

The invention has for its salient object to provide simple, practical and efficient gas detecting means.

Another object of the invention is to provide a diffusion analysis or detecting means that can be calibrated remotely.

Further objects of the invention will appear from the following specification taken in connection with the drawings which form a part of this application and in which:

FIG. 1 is a vertical sectional elevation of a detector embodying the invention.

FIG. 2 is a transverse sectional elevation taken substantially on line 2—2, looking in the direction of the arrows.

FIG. 3 is a view similar to FIG. 1 but showing a base through which wires are connected to the detecting element or hot wire.

FIG. 4 is a bottom plan view of the structure shown in FIG. 3; and

FIG. 5 is a vertical sectional elevation of the structure shown in FIG. 1 but showing a modification thereof.

In the embodiment of the invention shown in FIGS. 1 and 2 a body member or block 10 has a detection means 11 mounted therein; for example, a thin film detector, a flame ionization detector, a flame having a thermocouple or an electrical conductor associated therewith, or a hot wire detector, as shown, having terminals 12 and 13.

Mounted on the block 10 is a porous cap 14 which with the block forms a chamber that covers and encloses the element 11. The porous cap 14 acts as a membrane to permit diffusion therethrough into the chamber of the sample of air containing combustible gases being tested and as a flame arrestor to stop any flame from spreading or escaping from the porous cap 14.

A second porous cap 15 is mounted on the block 10 and surrounds the cap 14.

A conduit 16 extends through block 10 and opens into the space or passage between caps 14 and 15.

Under normal conditions, the detector element 11 is affected by the gases which surround and are diffused through the double porous caps 14 and 15.

When gases are introduced through conduit 16 the ambient gases are stopped from entering the porous cap 14 through the cap 15 due to the velocity of the gases leaving the porous cap 15.

The flow through conduit 16 not only stops the ambient air from entering the porous cap 14 but also completely surrounds it and causes the volume to be filled by diffusion with the gas in conduit 16.

Therefore the composition of the gas in conduit 16 can be varied so that the detector element 11 may be zeroed on pure air, or calibrated on a known combustible gas.

In FIG. 5 the conduit 18 is connected to the bottom of block 19 or body member and the gas passes upwardly through a passage 20. The outlet end of passage 20 is covered by a porous cap 21. A porous cap 22 on the body provides a chamber that encloses the cap 21 and the detector element 11.

FIGS. 3 and 4 show a block 25 connected to and extending below block 10.

Wires 26 and 27 extending through a passage 28 are connected to terminals 12 and 13.

It will be observed that the porous caps 14 and 15 provide a chamber having outer and inner coaxial spaced apart cylindrical porous walls and that the conduit 16 leads into the space between said cylindrical walls.

The bottom of the block 25 is recessed as shown at 30 and a reference detector means 31, shown as a filament or "hot wire" type, is sealed in the recess 30. The terminals of detector wire 31 are shown at 32 and 33.

Although certain specific embodiments of the invention have been particularly shown and described it will be understood that further modifications may be made without departing from the spirit and scope of the invention as expressed in the following claims.

I claim:

1. A gas detector comprising a body member having a detector means mounted thereon, a porous cap on said body member and forming therewith a chamber enclosing said detector means and providing for entry of a gas by diffusion through said cap into said chamber, a second porous cap on the body member surrounding and enclosing the first named porous cap in spaced relation thereto and a conduit in the body member and leading to the space between said porous caps, thereby providing for the introduction of known gases into said space for the purpose of checking the detector.

2. A gas detector comprising a body member having a chamber, detector means monuted in said chamber, and a porous cap surrounding and covering said means providing for entry of a sample gas by diffusion into said chamber, and a conduit in said body member and leading into said chamber and having a porous element therein providing for the introduction of another gas into the chamber by diffusion.

3. A gas detector comprising a body member having detector means mounted thereon, a porous cap on said body and forming therewith a chamber enclosing said detector means and providing for entry of a sample gas by diffusion through said cap into said chamber, said body member having a conduit leading into said chamber, and a second porous cap in said chamber between said conduit and said detector means providing for the introduction of a known gas through said conduit and by diffusion through said second porous cap into contact with said detector means.

4. A gas detector comprising a body member having a chamber having spaced apart outer and inner porous walls providing for entry of an external ambient sample gas by diffusion through both of said walls, detector means mounted inside said inner wall, and means including a conduit in the body member opening into the space between said walls for introducing a known gas into the space between said walls to eliminate the external sample and apply a known gas to said detector means by diffusion through said inner wall.

References Cited
UNITED STATES PATENTS

| | | | |
|---|---|---|---|
| 1,979,976 | 11/1934 | Marshall | 23—255 |
| 2,652,315 | 9/1953 | McEvoy | 73—27 |
| 2,781,506 | 2/1957 | Harrison | 73—23 |
| 2,882,719 | 4/1959 | Greene et al. | 73—27 |

RICHARD C. QUEISSER, *Primary Examiner.*

C. I. McCLELLAND, *Assistant Examiner.*

U.S. Cl. X.R.

23—255